United States Patent [19]

Tatian

[11] Patent Number: 5,072,104
[45] Date of Patent: Dec. 10, 1991

[54] ACHROMATIC NULL LENS

[75] Inventor: Berge Tatian, Stoneham, Mass.

[73] Assignee: Litton Systems, Inc., Lexington, Mass.

[21] Appl. No.: 532,776

[22] Filed: Jun. 4, 1990

[51] Int. Cl.$^5$ .............................................. G01J 1/20
[52] U.S. Cl. ................................. 250/201.9; 359/727
[58] Field of Search .................... 250/201.9; 356/360, 356/363; 350/442, 443, 444

[56] References Cited

U.S. PATENT DOCUMENTS

| | | | |
|---|---|---|---|
| 3,110,752 | 11/1963 | Becker | 350/442 |
| 4,103,990 | 8/1978 | Yamada | 350/442 |
| 4,953,960 | 9/1990 | Willamson | 350/444 |
| 4,958,931 | 9/1990 | Tatian | 356/360 |

*Primary Examiner*—David C. Nelms
*Assistant Examiner*—Que T. Le

*Attorney, Agent, or Firm*—Michael H. Wallach; Robert F. Rotella

[57] ABSTRACT

A wavefront correction system is provided which uses an achromatic null lens to correct various aberrations introduced in a spherical wavefront when the wavefront is reflected off a non-spherical surface, particularly a parabola. Chromatic aberration, including spherochromatism, is corrected over a relatively wide bandwidth. When used in conjunction with an interferometer and a variable wavelength source, the wavefront correction system provides adequate means for determining relative position errors of the segments of a segmented mirror. The derivative of the phase error is obtained with wavelength by measuring interference for different wavelengths of light. This allows position errors of greater than one half wavelength to be accurately measured.

5 Claims, 3 Drawing Sheets

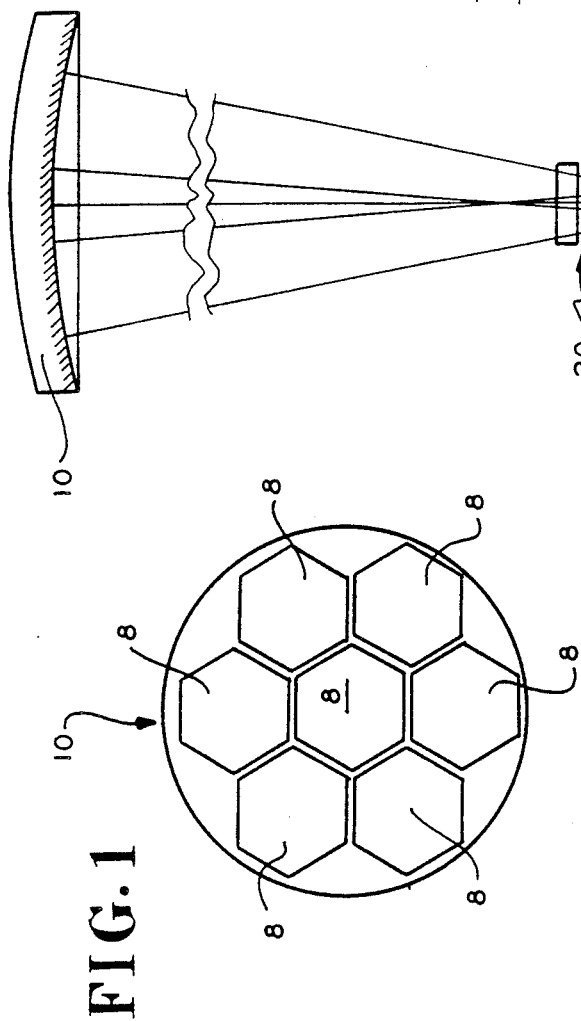
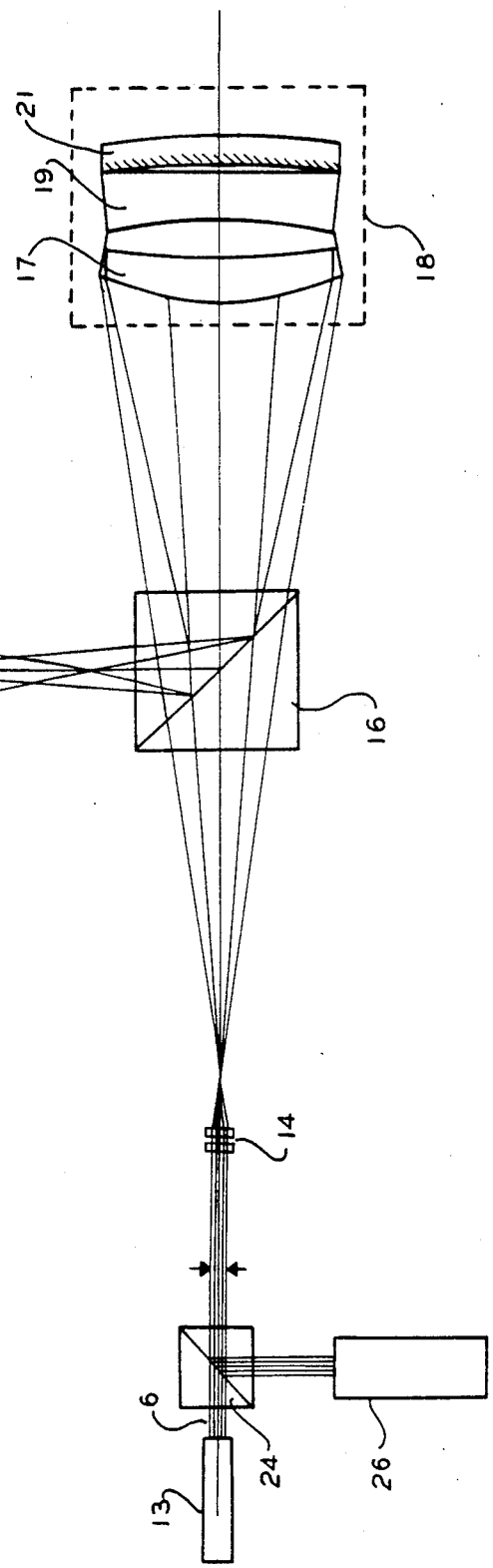
FIG. 1
FIG. 2

LENS PARAMETERS FOR:

OBJECT AT INFINITY
MAJOR COLOR = 0.6328μ
ENTRANCE PUPIL = 12.4826 mm DIAMETER

| LENS | MATERIAL | RADII mm | | THICKNESS MM | |
|---|---|---|---|---|---|
| 1 | Schott PK51 | R1 = | 30.8724 | T1 = | 6.3500 |
|   |             | R2 = | 46.5596 |      | 0.2540 |
| 2 | Schott KZFS1 | R3 = | -25.6898 | T2 = | 3.8100 |
|   |              | R4 = | 49.7343  | S2 = | 0.2540 |
| 3 | Schott PK51 | R5 = | 23.0010  | T3 = | 6.3500 |
|   |             | R6 = | -47.6876 | S3 = | 34.1679 |
|   |             |      |          | S4 = | 203.2000 |
| 16 | Schott BK7 |      |          | T4 = | 50.8000 |
|    |            |      |          | T5 = | 50.8000 |
|    |            |      |          | S5 = | 180.5703 |
| 4 | Schott BK7 | R7 = | 148.3637 | T6 = | 31.7500 |
|   |            | R8 = | 506.4769 | S6 = | 27.1257 |
| 5. | Schott BK7 | R9 =  | -223.4642 | T7 = | 20.3200 |
|    |            | R10 = | 2339.7803 | S7 = | 9.6081 |
| 6. | Mirror | R11 = | -477.8541 | T8 = | 50.8000 |
|    |        |       |           | S8 = | 98.4712 |
| 7. | Schott KZFS1 | R12 = | 3918.8742 | T9 = | 15.2400 |
|    |              | R13 = | 272.3686  | S9 = | 2.5400 |
| 8. | Schott PK51 | R14 = | 284.1435  | T10 = | 19.0500 |
|    |             | R15 = | -283.8238 | S10 = | 10091.9843 |
| 10 | Parabolic Mirror | R = | -9999.9800 | | |

FIG. 3

ACHROMATIC NULL LENS

BACKGROUND OF THE INVENTION

This invention relates to the correction of various aberrations of a wavefront of light over a relatively wide band of wavelengths. In many modern optical systems, it is desirable to change or correct the shape or structure of a wavefront of light. Transmission of light through an optical system often distorts the wavefront in a number of different ways. These distortions alter information carried by the wavefront in a wavefront analysis system and render the wavefront unusable.

A particular application of wavefront analysis relates to the alignment of mirror segments in a segmented mirror system. A segmented mirror system replaces a monolithic primary mirror as used in large aperture telescopes. Such segmented mirrors are becoming more popular for both astronomical and military applications. Segmented mirror systems use arrays of relatively small optical segments, each of which must be actively controlled to allow the composite optical surface to maintain the desired shape of an ideal monolithic surface.

In such systems, it is not only necessary to control the tilt of a mirror segment along two axes, but the displacement of the segment along the direction perpendicular to the segment surface must be controlled also. The three degrees of control per segment allow two or more segments to reflect light from a given source to the same geometric point with the same phase, so that the light behaves as if it were reflected from a single ideal surface.

The errors in tilt are easily handled, since they can be readily observed in the far field of the telescope. The displacement errors are not so readily observed, however, since they are normal to any image surface and must be measured to a fraction of the wavelength of light. Interferometers are used to measure displacement errors between different mirror segments by interfering different portions of a wavefront reflected from the entire mirror surface. When two portions of a wavefront are combined which correspond to reflections from two misphased mirror segments, destructive interference occurs which is detectable in the interferometer. Due to the wave nature of light, the interference pattern repeats as the mirror separation is increased beyond one half wavelength. A one half wavelength mirror separation corresponds to a path length difference of one full wavelength since the extra distance is travelled both before and after reflection. The one wavelength path length difference causes a relative phase shift of $2\pi$, which puts the combined waves back in phase. A traditional interferometer cannot discern between a phase shift $\phi$ and a phase shift of $\phi + 2\pi$ when used with a monochromatic source because the interference pattern repeats. Because of this so called "$2\pi$ ambiguity factor", an interferometer alone is not sufficient to accurately detect the displacement error in monochromatic light. Alternative position sensing means must therefore be employed.

Interferometers are generally designed to function with a collimated beam or a spherical wavefront. The segmented mirror to be tested is often of a parabolic or near parabolic shape. A spherical wavefront of light used to test the segmented mirror will undergo distortion as it reflects off the parabolic segmented mirror. This distortion is called spherical aberration and is due to the reflection of a spherical wavefront off a non-spherical surface. Because the light incident on the mirror surface is not in a direction perpendicular to the surface, it is not reflected back upon itself as a spherical wavefront. Furthermore, because the difference between a spherical surface and a parabolic surface increases with radius, the spherical aberration increases toward the edges of the wavefront. The spherical aberration thus causes different portions of the wavefront to focus at different points along the optical axis.

The correction of spherical aberration due to reflection from a paraboloidal reflecting surface is most easily accomplished by introducing into the optical path of the system a correction device known as a null lens. A null lens introduces aberration to the wavefront passing through it which compensates for the aberration introduced by the non-spherical surface. Thus a spherical wavefront passing through the system is corrected for spherical aberration, and leaves the system as if it had been reflected off a spherical surface.

Traditionally, null lenses have been purely refractive devices because for large mirrors a reflective device would require one that was too large and expensive to be practical. Refractive elements have the undesirable feature of dispersion. As a result, nulling occurs only within a very narrow band of wavelengths. This is satisfactory for measuring the continuous errors that afflict the surface figure of a monolithic mirror, but cannot be used to measure displacement errors larger than one half a wavelength of the light used. The $2\pi$ ambiguity factor in displacement measurements greater than one half wavelength makes it impossible to get an accurate interferometric measurement. This displacement may be determined, however, if the wavelength of the light incident upon the reflecting surface is varied while output measurements are taken with the interferometer over a continuous range of wavelengths. However, this technique requires a null lens which is functional over a band of wavelengths much wider than that which has been achieved with an all-refractive null lens.

SUMMARY OF THE INVENTION

The present invention comprises a wavefront correction system and method for correcting the spherical aberrations in a polychromatic wavefront of light. Such spherical aberrations may be caused by reflecting the wavefront off a parabolic or near parabolic reflecting surface. The system comprises a light source for generating an original wavefront of polychromatic light, and a beam splitter through which the original wavefront of light is partially transmitted. From the beam splitter, the light is transmitted to an achromatic null lens. The null lens comprises a zero power lens combination and a concave mirror. The null lens is arranged such that light entering the null lens passes through the zero power lens combination, reflects off the mirror, and is refocussed back through the zero power lens combination to exit the null lens. The wavefront thereby returns to the beam splitter. An Offner field lens is in the path between the beam splitter and the reflecting surface. Light returning from the null lens is partially redirected by the beam splitter through the Offner field lens and to the reflecting surface. Upon reflecting off the reflecting surface, the light retraces the original path through the Offner field lens to the beam splitter. The light is then again partially reflected off the beam splitter redirected back to the null lens. The light passes through the null lens and is once again refocussed by the null lens returning to the beam splitter, where it is partially transmitted through the beam splitter. The wavefront correction system may be used when the reflecting surface is a segmented mirror. The system may further comprise an interferometer capable of measuring phase shift differences between different portions of the wavefront transmitted through the beam splitter.

BRIEF DESCRIPTION OF THE DRAWINGS

FIG. 1 shows a parabolic segmented mirror similar to those used for multiple mirror telescopes.

FIG. 2 is a system overview schematic of a preferred embodiment of the invention with ray tracing lines shown between the optical components of the system.

FIG. 3 is a table listing the design parameters of a preferred embodiment of the invention.

DETAILED DESCRIPTION OF THE PREFERRED EMBODIMENTS

Figures 4A, 4B:
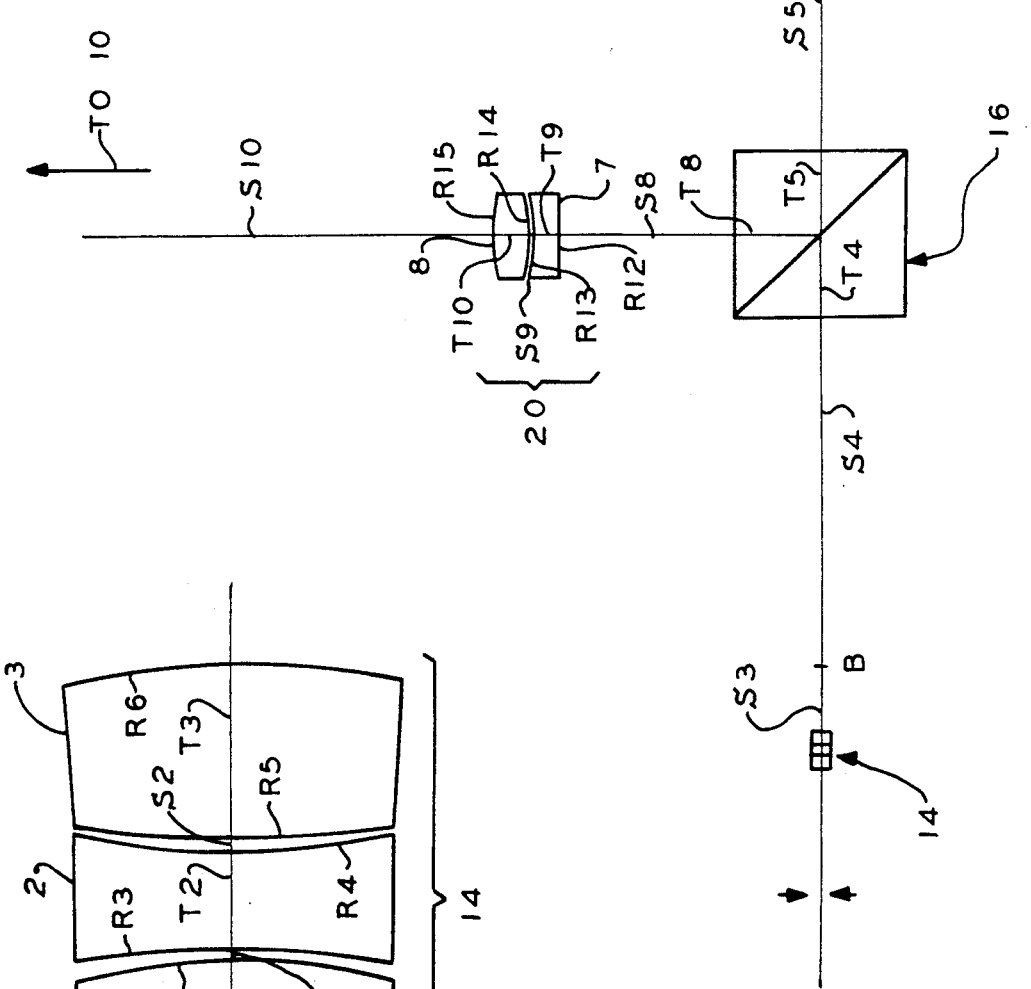
FIG. 4A is a labelled diagram corresponding to the table of FIG. 3.
FIG. 4B is an enlarged view of the diverger lens combination labelled to correspond to FIG. 3.

The parabolic mirror 10 shown in FIG. 1 is divided into seven independently controllable active segments 8. The mirror may be used as the primary mirror in a beam director or in an imaging telescope. The mirror segments 8 are individually controlled. Each segment is adjusted in tip, tilt, and piston to provide the best overall beam quality. Tip and tilt are used to describe the two rotational directions of movement for each segment, while piston refers to displacement of the mirror segment in a direction perpendicular to the segment surface. Each of the mirror segments have several actuators to control its position. A segment may thereby be adjusted from a remote location to align it with the other mirror segments.

An overview of a preferred embodiment of the wavefront correction system is shown in FIG. 2. A collimated beam of light 6 is directed through input beam splitter 24 from variable wavelength laser 13, and into diverger 14. Diverger 14 brings the light to a focus directing it through prism beam splitter 16 toward null lens 18. The null lens 18 consists of a spherical mirror 21 and a zero power lens combination which in the present embodiments is a positive lens 17 followed by a negative lens 19. The null lens 18 retroreflects the incoming light, adding a predetermined amount of aberration to the wavefront. This aberration compensates for the aberration induced later by reflecting the wavefront off the non-spherical test surface 10. After being retroreflected by the null lens 18, the wavefront returns to beam splitter 16 where it is partially reflected toward achromatic Offner field lens 20.

A monochromatic Offner field lens is a standard lens combination used with monochromatic null lenses. Such a lens is used to image a wavefront pupil onto a surface making it easier to test. The Offner field lens also helps reduce higher order monochromatic aberrations in the wavefront passing through it. It is necessary in the present invention to use an Offner field lens which is achromatic in order to preserve the multichromatic nature of the system. After leaving the Offner field lens 20, the wavefront is projected onto and reflected from parabolic test surface 10. The test surface 10 is much larger and further away than shown in FIG. 2 as indicated by the broken lines in the ray trace.

The parabolic surface is the 7-segment parabolic mirror shown in FIG. 1. The incoming wavefront is projected onto the entire mirror surface. Tests of individual portions of the mirror surface 10 may be performed by setting the system up such that the wavefront is projected only onto those portions of the mirror surface selected.

The reflection of a spherical wavefront off a parabolic surface changes the structure of the wavefront by what is known as spherical aberration. Spherical aberration causes different portions of a wavefront to focus at different points along the optic axis of the wavefront. By knowing the dimensions of parabolic test surface 10, the wavefront is modified by the null lens which is specifically designed to compensate for the spherical aberration of test surface 10.

When the wavefront reflects off the parabolic surface 10, it returns through the Offner field lens 20 to the beam splitter 16 where it is once again partially reflected, this time back toward null lens 18. From the ray tracing in FIG. 2, it can be seen that the null lens 18 adds spherical aberration to the wavefront which conforms it to test surface 10. Because of aberration introduced by the null lens, the wavefront reflects off test surface 10 and returns to the null lens 18 unchanged by the reflection. Each portion of the wavefront reaching the mirror surface is incident upon the mirror surface in a direction perpendicular to the mirror surface. Thus, the ray tracing of FIG. 2 shows each ray reflecting from the test surface back upon itself. Upon returning to the null lens, each portion of the wavefront retraces its path through the null lens. The null lens 18 thereby reconstructs the spherical wavefront. The wavefront is then refocussed by the null lens 18 and reflected back to the beam splitter 16. At the beam splitter 16, the wavefront is partially transmitted through to diverger 14.

In the present embodiment, the exiting beam is collimated by diverger 14 and partially redirected off input beam splitter 24 to interferometer 26. The interferometer combines chosen portions of the wavefront so that a comparative analysis of different wavefront portions can be performed. It should be noted that diverger 14 serves only to transform a spherical wavefront to a collimated beam or a collimated beam to a spherical wavefront. If an interferometer which operates on a focussed beam is used with a light source which is a focussed beam, the diverger 14 is not necessary.

Null lens 18 is the heart of the wavefront correction system providing nearly all the aberration necessary to nullify the aberration introduced by the parabolic reflecting surface. The main advantage of null lens 18 is that it is achromatic. An achromatic lens is a lens that provides correction over a relatively wide band of wavelengths. The null lens 18 provides a usable wavelength band of approximately 0.1 $\mu$m. This is over a thousand times wider than the usable wavelength band of a conventional null lens. A conventional null lens, although having a much narrower bandwidth, is satisfactory to measure the continuous errors that afflict the surface of a monolithic mirror. But to measure the discontinuous errors found on a segmented mirror, a more sophisticated technique is required.

A relative piston error between two mirror segments greater than one half a wavelength of light results in an ambiguous position measurement in a conventional interferometer. The ambiguity is for a multiple of one half wavelength because a wavefront being used to test the surface must be reflected off the surface. A piston error of one half wavelength therefore corresponds to a phase error of one full wavelength, since the light must travel twice the distance of the position error. Because of this $2\pi$ ambiguity factor, the present wavefront correction system uses a variable wavelength laser for a light source such that the wavelength of the light can be varied over a continuous range. The light used to test the parabolic surface is varied in wavelength while the phase difference between two portions of the wavefront which correspond to reflections from two different mirror segments is measured in the interferometer for different wavelength values. Having the interferometer output for a range of wavelength values provides the information necessary to determine the piston error between two mirror segments. Once the error is determined, the segments are adjusted with the use of mechanical actuators or displacers.

The achromatic null lens of the present embodiment controls two kinds of color aberration. One of these is the paraxial aberration, which causes the different color images to focus at different places. This correction is done by an application of the Schupmann principle, which states that if the achromatism is accomplished by only one kind of glass (or more than one kind of glass if their dispersive characteristics are close enough), the paraxial achromatism will be near perfect. The null lens of the present embodiment, as shown in FIG. 2, is a positive lens 17 followed by a negative lens 19, both lenses being made of the same glass, i.e., Schott glass BK7. It should be emphasized at this point that the type of glass is not important as long as both elements are of the same glass or have essentially equal dispersive characteristics. The two lenses are made of equal but opposite power, thus the overall power of the lens combination is approximately zero.

The second color aberration that is corrected by the lenses is the spherochromatism. Spherochromatism is a variation with wavelength of the spherical aberration. The null lens 18 produces an enormous amount of aberration to counteract the spherical aberration of the test mirror 10, which is much larger than the null lens. In a normal monochromatic null lens there would be a correspondingly large variation of this aberration with wavelength. In the present embodiment, the null lens provides correction of the spherochromatism over a useful wavelength band of about 0.1 µm.

The design parameters for the present embodiment are listed in the table of FIG. 3 which corresponds to the labelled elements of FIGS. 4A and 4B. FIG. 4B is an enlargement of the diverger 14 of FIG. 4A to show specific lens surfaces referenced in FIG. 3. Each lens in FIGS. 4A and 4B is described by material, surface radii, and thickness. Each mirror is described by radius of curvature.

The wavefront exiting the system through beam splitter 16 is analyzed by interferometer 26 which may be a Twyman-Green type. The Twyman-Green type interferometer produces a fringe pattern that is essentially a contour map of the wavefront, the contour spacing being one wavelength of the light used. Normally the errors in the test surface and the emerging wavefront are continuous, so that the fringe pattern will consist of continuous curves. If the test surface has a discontinuity in it, such as a step between two segments of a segmented mirror, a fringe crossing the part of the wavefront corresponding to the step is shifted x fringe spaces, where x is twice the height of the step measured in wavelengths. Since with monochromatic light there is no way to distinguish one fringe from another, the jump will be known only to within one fringe spacing.

If white light is used instead of a monochromatic beam, then a certain fringe will be distinguishable, namely the one corresponding to exact equality of the axial distances in the two paths of the interferometer. This is because a difference in path will be a different number of waves for each wavelength, and so the destructive interferences corresponding to the locations of fringes in each wavelength will spread over an area, resulting in a more or less washing out of the fringe pattern. The only fringe at which all the wavefronts interfere together is the one where the path difference is zero, and this fringe will be the only black one. Therefore, using the chromatically corrected null lens principle of this invention, one can identify the null path difference fringe on both sides of the discontinuity, and thus determine unambiguously the amount of the jump in waves corresponding to the step discontinuity in the test surface.

The above requires that the interferometer used be an equal path type interferometer. That is, the test and reference paths are the same length. This is inconvenient, but not impossible, if the test path is very large, as in the present embodiment. Before the invention of the laser, one was compelled to use equal path interferometers because a light source with the necessary coherence and brightness to make an unequal path interferometer practical was unavailable. Now, unequal path interferometers are almost exclusively the ones used because of their great convenience. An unequal path interferometer has to be used with very monochromatic light because the unequal paths would have the same effect on the contrast of the fringes as a step in the test beam whose magnitude was equal to the difference in the paths. This would seem to vitiate the use of such an interferometer with this invention. It can be used, however, if one samples the passband of the invention at a sequence of discrete wavelengths, using one or more lasers. To avoid ambiguity, the spacing of these wavelengths must be such that the change in path for one wavelength to the other due to the mirror segments being misphased is less than $\frac{1}{2}\lambda$. In order to establish this maximum wavelength spacing, a maximum position error between two mirror segments is chosen. If D equals the maximum position error, then $$2D(1/\lambda - 1/\lambda + \Delta\lambda) < 0.5$$

If $\lambda\Delta < < \lambda$, then $$\lambda\Delta < 0.25\lambda/D$$

If this condition is satisfied, the jump in fringes across the discontinuity is less than $\frac{1}{2}$ the fringe spacing and so corresponding fringes can be identified.

The present embodiment gives the simplest configuration for the null lens. Other zero power lens combinations may be used for the null lens. Other aberration correcting elements may also be added, although it is good practice in the design of null lenses to keep the optical components to a minimum.

In general, the results obtained with the present configuration can be essentially duplicated by embedding the basic configuration with more elements. An aspheric mirror may be alternatively used with the null lens. The spherical aberration introduced by the aspheric mirror would be small compared to the overall spherical aberration being generated by the null lens. The additional asphericity could be compensated for by changing the refractive components of the system.

While the invention has been particularly shown and described with reference to embodiments thereof, it will be understood by those skilled in the art that various changes in form and details may be made therein without departing from the spirit and scope of the invention as defined by the appended claims.

I claim:

1. An achromatic null lens for adding a predetermined amount of aberration to a wavefront comprising: a zero power lens combination and a concave mirror arranged such that a wavefront passing through the zero power lens combination, reflects off the mirror, and passes back through the zero power lens combination, exiting the null lens.

2. The null lens of claim 1 wherein the zero power lens combination is a positive-negative doublet.

3. The null lens of claim 1 wherein the lenses of the zero power lens combination are all made from glass with essentially equal dispersion characteristics.

4. The null lens of claim 1 wherein the components of the null lens have a useful wavelength band of at least 0.1 micrometers.

5. The null lens of claim 1 wherein the concave mirror is a spherical mirror.

* * * * *

UNITED STATES PATENT AND TRADEMARK OFFICE
CERTIFICATE OF CORRECTION

PATENT NO.    :  5,072,104
DATED         :  December 10, 1991
INVENTOR(S)   :  Berge Tatian It is certified that error appears in the above—identified patent and that said Letters Patent is hereby corrected as shown below:

On title page item [63], and col. 1, line 4, insert "This is a divisional of U.S. application serial no. 07/338,826 filed April 14, 1989, now U.S. Patent No. 4,958,931."

Signed and Sealed this

Ninth Day of March, 1993

*Attest:*

STEPHEN G. KUNIN

*Attesting Officer*       Acting Commissioner of Patents and Trademarks